May 9, 1967 M. G. SENDZIMIR 3,318,130
BACKED MILL WITH READILY EXCHANGEABLE WORKING ROLLS
Filed Jan. 11, 1965 5 Sheets-Sheet 4

INVENTOR.
MICHAEL G. SENDZIMIR,
BY Yungblut, Melville,
Strasser + Foster,

ATTORNEYS.

May 9, 1967 M. G. SENDZIMIR 3,318,130
BACKED MILL WITH READILY EXCHANGEABLE WORKING ROLLS
Filed Jan. 11, 1965 5 Sheets-Sheet 5

INVENTOR.
MICHAEL G. SENDZIMIR,
BY Youngblood, Melville,
Strasser & Foster,
ATTORNEYS.

United States Patent Office 3,318,130
Patented May 9, 1967

3,318,130
BACKED MILL WITH READILY EXCHANGEABLE
WORKING ROLLS
Michael G. Sendzimir, % T. Sendzimir, Inc., P.O. Box
1350, Waterbury, Conn. 06720
Filed Jan. 11, 1965, Ser. No. 424,571
16 Claims. (Cl. 72—226)

This invention relates to a rolling mill for rolling narrow and wide strips, as well as sheets, preferably but not necessarily, with small diameter working rolls. The mill can be used for hot or cold rolling and either as a reversing mill or as part of a tandem mill train, a single direction one-pass strip mill, or a single or reversing sheet mill.

It is known in the art of rolling flat products that small diameter working rolls will produce a heavier reduction per pass when backed by larger diameter rolls. Putting this another way, the roll separating forces for a given reduction are less with small diameter working rolls. One type of mill making use of this phenomenon is known as a 4-hi mill. Many varieties of such mills have been built, with the mill drive applied either to the working rolls or to the back-up rolls. The working rolls, if they are slender, would be deficient in transverse stiffness when journalled at their end portions. Consequently they are used against backing rolls of very much larger diameter and stiffness in the typical 4-hi arrangement.

In mills of this type, the backing rolls, being in the form of heavy, comparatively large diameter members, are not exposed to as much wear on their surfaces as are the working rolls. Due to normal wear, spalling and occasional damage from cobbles, the working rolls have to be changed frequently. Also, it is customary to adapt the roll shape to the type of material and the cross sectional characteristics of the final product, by crowning or otherwise configuring the rolls, i.e. making the diameter of the roll at its central portion either larger or smaller than that at its ends. Further, since the final rolling mill product depends on the roll face finish, it is often necessary to change the working rolls upon the completion of the roughing operation. In any of the above cases, the time required to change the said working rolls is quite substantial and greatly increases the down time of the said mill.

It is a basic object of the invention to provide a solution for the problems inherent in the necessity for frequent working roll exchanges or substitutions in mills generally of the 4-hi type. By "mills of the 4-hi type" is meant mills having a pair of working rolls adapted to contact the work piece, and a backing means for each working roll. The backing means are frequently large diameter rolls, journalled at their ends in the mill frame members, each having frictional contact with its working roll when in operating position; but the backing means may take other rotative but rigid forms as later set forth.

It has been suggested in the art to provide two sets of working rolls in such a mill structure, the spare set being slidable into operating position along curved guides. This, however, does not provide an adequate solution for the problems involved, as will later be apparent.

It is an object of the invention to provide a rolling mill with which it will be possible to rough the material with one set of working rolls, and then do the finishing passes with another set or sets which have a different or better surface finish, with a minimum of down time.

Another object is to provide a mill structure in which provision is made for correlating the length of the working rolls with differing widths of the material being rolled.

Yet another object of the invention is to provide a mill in which working rolls having different amounts of crowning or camber can easily and rapidly be brought into the working position.

Yet another object of the invention is the provision of a mill in which pairs of working rolls of different effective diameters can easily and rapidly be brought into the working position, as for example when it is desired to start the rolling with relatively larger diameter working rolls and then, as the material becomes thinner and harder, to shift to working rolls of relatively smaller diameter.

It is an object of the invention to provide in a mill of the type referred to, for the ready removal and replacement of entire assemblies of pairs of working rolls, and also to provide for the removal and replacement of individual working rolls while other working rolls are in operation.

It is an object of the invention to provide means whereby working rolls which are not in operation could have their surfaces improved by either regrinding or repolishing with a stone by incorporating such equipment, known in the art, in one of the idling positions, and to supply means to press the working roll against the back-up roll in order to provide the drive. Means are provided at the same time to clean the surface of the back-up roll just prior to contact with the said working roll which is being refinished.

It is also an object of the invention in one aspect to provide a combination of rolls and intermediate rolls backed by bearings on a suitable beam structure. When this is done, the working rolls may be made of hard but relatively brittle material such as tungsten carbide. Moreover for working rolls made out of such very expensive material and for rolling narrow strip, the working roll bodies need not be limited to the full width of the mill, but may be shorter; and such rolls may be indexed into the working position for narrow widths of strip when needed, thereby requiring less grinding and providing extra economy in operation.

These and other objects of the invention which will be set forth hereinafter or will be apparent to one skilled in the art upon reading these specifications, are accomplished by those constructions and arrangements of parts of which certain exemplary embodiments will now be described. Reference is made to the accompanying drawings wherein.

This invention in a representative simple form utilizes a plurality of working rolls around a backing roll. The working rolls can be alternatively indexed into the working position. The necks of the working rolls are mounted for rotation in chocks held in cages, which in turn are mounted on separate bearings and are provided with suitable gears and a drive to permit indexing and accurate locking in a given position. The chocks can be identical or they can vary in size to accommodate different sizes and types of working rolls.

The working rolls mounted in the cages have either mechanical or fluid means acting to push them away from the surface of the backing rolls when not in operation. They can then remain at rest; and their surfaces are preserved until the need for using them again arises, at which time they are again indexed into the working position on the vertical centerline of the mill.

Lubrication of the working roll bearings can be accomplished by using grease, oil, or even oil mist; and means for withstanding the axial thrust of said working rolls can be provided in the cages.

Figure 1:
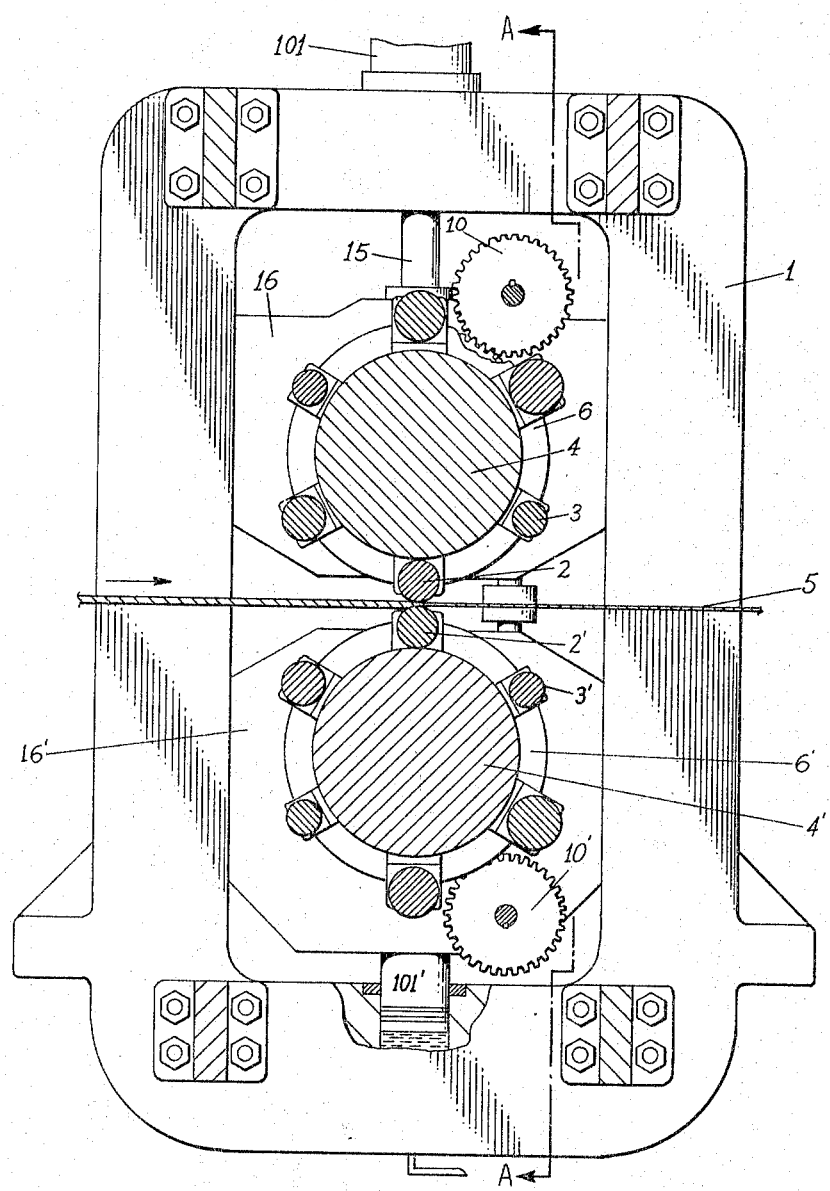
FIG. 1 illustrates a relatively simple form of the present invention in a cross sectional view of a mill.

As shown in FIG. 1, the mill comprises a housing or frame 1 and a number of pairs of working rolls 2, 2′, 3, 3′ etc., disposed in cages 6, 6′ around the backing rolls 4, 4′. As shown, only the cooperating working rolls 2, 2′, acting on the workpiece 5 are in contact with the respective backing rolls 4, 4′; the remaining pairs of working rolls 3, 3′ etc. are preferably held away from the backing rolls, in reverse position, as later described.

Figure 2:
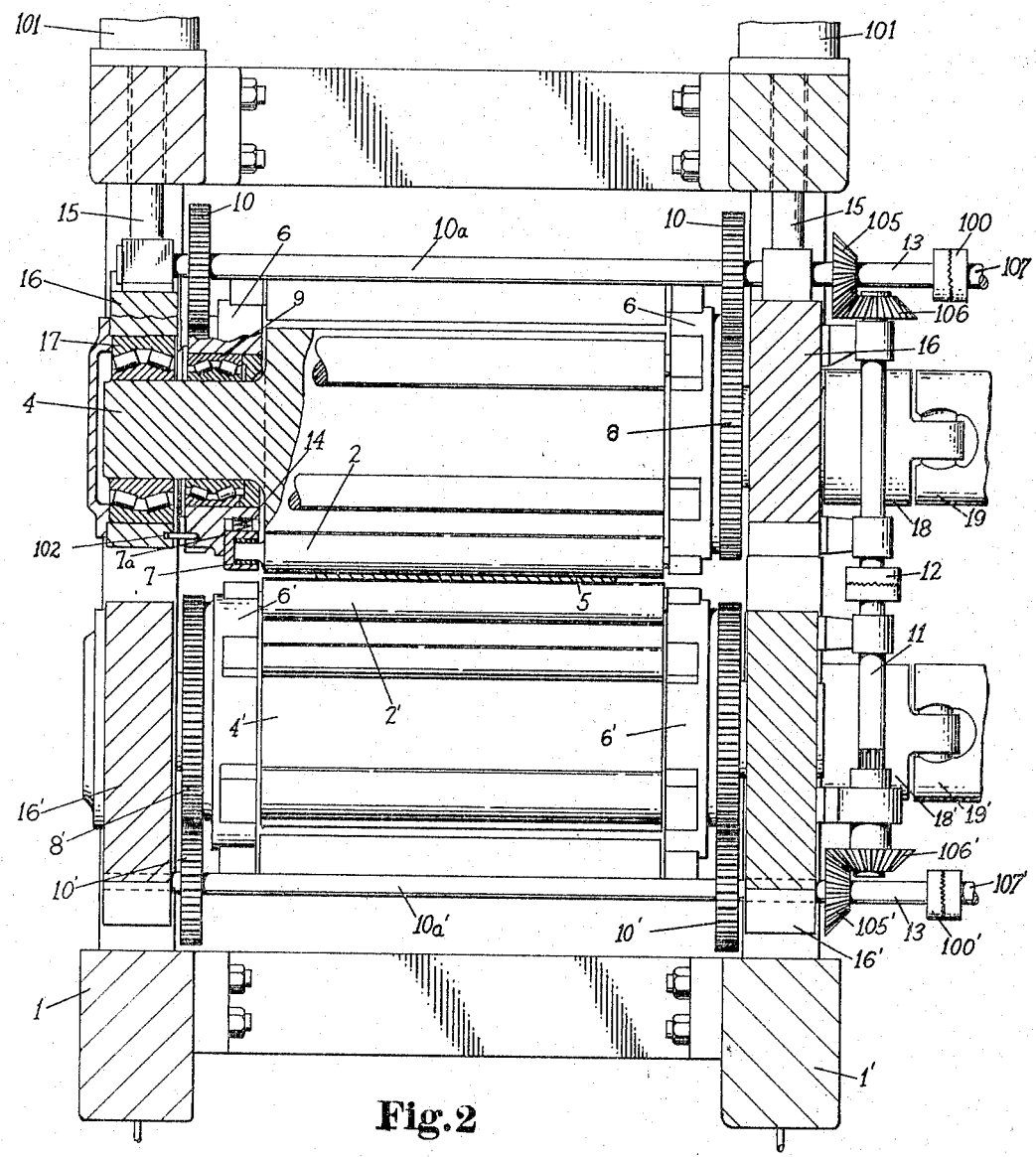
FIG. 2 is a vertical sectional view of the same mill taken across the mill on the section line A—A of FIG. 1.

Cages 6 and 6′ hold individual chocks 7a for working roll bearings 7, as shown in FIG. 2. A ring gear 8 is firmly attached to each cage. The cages can rotate about the back-up rolls 4 and 4a independently of the rotation of the back-up rolls. Each cage and its ring gear rotate on bearings 9 mounted directly on the back-up rolls 4 and 4′; and the rotation of the upper cage is synchronized with the rotation of the lower cage as follows: A pinion 10 is in mesh with the ring gear 8 of the upper cage. A similar pinion 10′ is in mesh with the ring gear 8′ of a lower cage; and the top and bottom pinions on each side of the mill are joined together by a vertical shaft 11 and bevel gear assemblies 105, 106, 105′ and 106′. The shaft 11 is provided with a clutch 12 in order to permit simultaneous or separate motion of the top and bottom cages 6 and 6′, all as will be apparent from FIG. 2.

The drive for the cages comes from a separate power source, not shown, connected to shaft 107 through shafts 13 and 13′. In more elaborate mill designs a second power source, not shown, can be connected to shaft 107′ in the bottom assembly as shown in FIG. 2, to move it independently upon disconnecting the clutch 12. Shafts 13 and 13′ may further be provided with clutches 100, 100′, to disconnect a given power source, when the drive is to be supplied from a single power source, either upper or lower.

In the mill of FIGS. 1 and 2, the backing roll necks are journalled in bearings (one of which is shown at 17) in chocks 16 and 16′ slidably mounted in openings in the end frames of the mill. The mill may be provided with conventional screw-down means such as mechanical, electric or hydraulic devices 101 and 101′ mounted on end frames of the mill and engaging the chocks 16 and 16′. The necks of the backing rolls may be prolonged on one side of the mill, as shown at 18, 18′ in FIG. 2, and connected by coupling means 19 and 19′ to a pinion stand and a mill drive motor. These latter elements have not been shown.

When a pair of the working rolls are in working position, as shown in FIG. 1, it is necessary that they lie between the backing rolls 4 and 4′, with the axes of the working rolls lying in or near a plane embracing the axes of the backing rolls. Also, it is necessary that the axes of the operating working rolls be parallel with each other, i.e. the working rolls must not be cocked. It has been explained that the cages are rotated only when it is necessary to index a different pair of the working rolls into the working position.

The pinions 10 for the upper cages 6 are shown interconnected by a shaft 10a, while the pinions 10′ for the lower cages are interconnected by a shaft 10a′. This insures simultaneous rotation of opposite cages for indexing.

In order to make the indexing of the cages more exact several expedients may be used. One such expedient includes properly indexing the power sources driving the shafts 13 and 13′ by known means, such as a selsyn in case of an electric motor. Another way is through a positive lock 102 which would protrude from the chocks 16 and 16a and lock the cages in selected positions against the adjacent chocks. Such a lock will have to be retracted during indexing; but this may be done by known means such as magnetic, fluid or purely mechanical devices.

Also it is possible to include in the shafts 10a and 10a′ adjustable means whereby the rotative positions of the pinions on the ends of these shafts may be varied.

Working rolls 2, 2′ are mounted in chocks 7a acted on by springs 14 which push the said chocks away from the chock pockets in the cages 6, 6′. These springs are compressed when the working rolls come into working position in contact with the workpiece. Screw-down pressure P from a source 101 is applied through screw-down posts 15 and acts on the necks of back-up rolls 4 through the chocks 16 and bearings 17, as has been explained.

Figure 3:
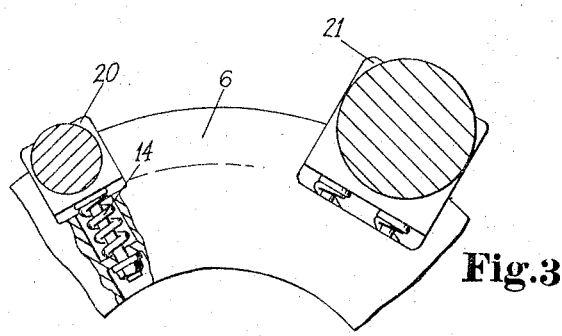
FIG. 3 is a fragmentary elevational view with parts in section showing means for mounting the working rolls.

FIG. 3 shows a portion of a cage 6 and two possible arrangements of working roll chocks, where the working rolls may have to be of various sizes. For small diameter working rolls only a small chock 20 is needed; whereas for larger diameter rolls a bigger chock 21 with a correspondingly larger pocket in the cage will be necessary. Intermediate sizes may also have to be used, depending on the rolling practice.

In certain cases it may be necessary to prerotate the working rolls, i.e. the working rolls which will be in contact with the rotating backing rolls when in operating position, before the workpiece 5 enters the roll bite. For this, the action of springs 14 which tend to keep the working rolls out of contact with the backing rolls may be changed by converting them into tension springs, tending to pull the chocks so as to press the working roll against the backing roll. Either fluid (hydraulic or air) or mechanical (e.g. cams) means may be provided to push the chocks in the opposite direction so as to bring the working rolls out of contact with the backing roll. Thus, any set of working rolls could be rotated by friction with the backing roll, whether it is in contact with the workpiece or not, releasing the counterpressure and allowing the springs to pull the given working rolls against the back-up roll.

To start a rolling operation, the workpiece 5 is introduced into the open bite of working rolls 2, 2′. The bite is then closed. The springs 14 are thus compressed, and the working rolls rotated by friction with the backing rolls; and the mill starts its operation as a normal 4-hi mill. While a pair of the working rolls 2, 2′ are in operation any of the other rolls which have been indexed to an accessible position may be removed for replacement, repair or grinding.

It is also possible to dress idle working rolls in the mill even while the mill is operating with other working rolls.

Figure 8:
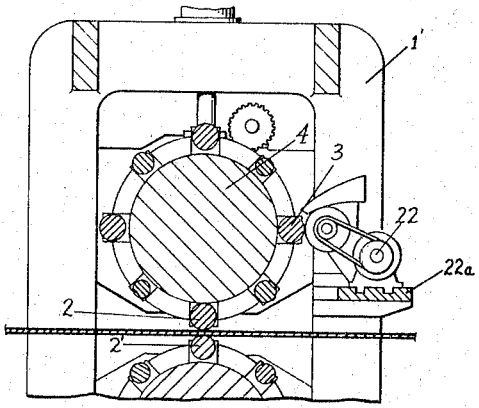
FIG. 8 is a partial sectional view showing a means for dressing or grinding a working roll while another working roll of the group is operating.

FIG. 8 shows a means of attaching a roll grinding or roll polishing apparatus 22 which is mounted on a track 22a between housing columns 1, 1′. Means may be provided for rotating a working roll 3 directly and independently by the apparatus 22, or if it is desired to use the drive from the backing roll, the already described means for pressing the working roll 3 against the back-up roll may be used.

When working rolls of very small diameters are used in a 4-hi mill, there always exists a problem of lateral roll bending. Under normal tension conditions in the workpiece 5, the working roll will tend to bend in a direction opposite to the movement of the workpiece. Should the tension in workpiece 5 increase above a certain limit, however, the roll will tend to bend in the direction of the movement of the workpiece.

It is known in the art to support the working rolls of 4-hi mills against such bending by providing bar-like supports extending along portions of the entire length of the roll face. Such supports are usually mounted on the back-up roll chocks or on the mill housing. In a mill of the type shown in FIG. 1 such an arrangement would be impracticable as it would interfere with quick indexing of cages 6, 6' into desired positions.

Figure 4A:
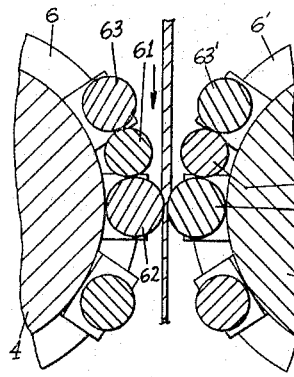
FIG. 4a is a fragmentary sectional view showing another means for minimizing transverse deflection of the working rolls.
Figure 4:
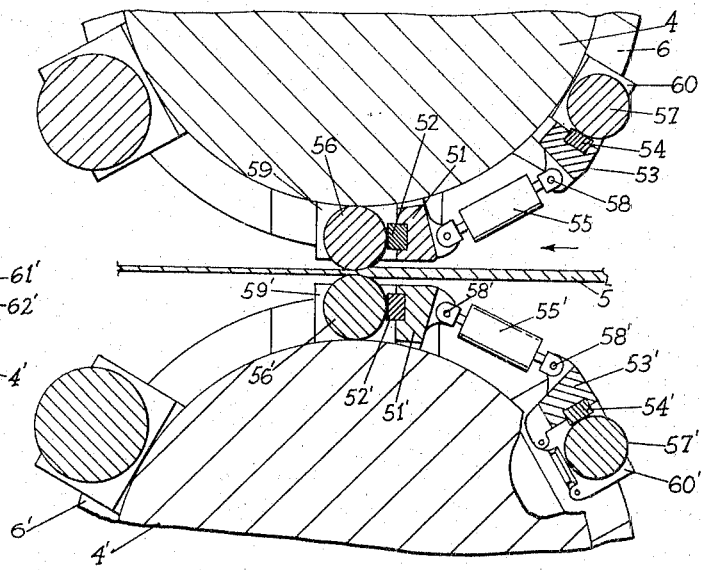
FIG. 4 is a fragmentary sectional view showing means for minimizing transverse deflection of the working rolls.
Figure 5:
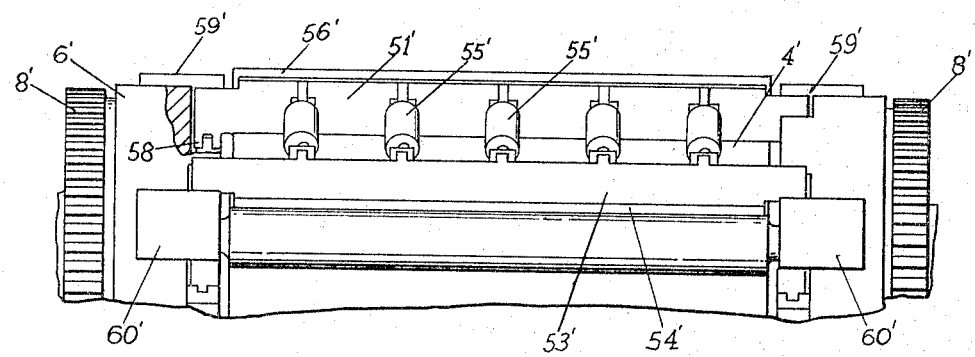
FIG. 5 is a partial elevational view of the same apparatus.

FIGS. 4 and 5 show an arrangement which will provide against working roll bending in the mill of the present invention. Working rolls 56, 57 are each backed from one side by bearing bars 52, 54, mounted in bearers 51, 53 respectively. One sided support must be used because of space considerations. Thus, in reverse rolling, i.e. in a direction opposite to the arrow in FIG. 4, cages 6 would be rotated so as to bring roll 57 into the position of roll 56 in FIG. 4. The bearers 51, 53 are hinged to chocks 59, 60 and biased against each other by a plurality of fluid, electric or mechanical devices, shown here, as an example, in the form of cylinders 55 hinged to bearers at 58, 58'.

Bearing bars 52, 54 are made of any suitable material preferably much softer than the working rolls 56, 57 so as not to damage them. Cylinders 55 press the bars 52, 54 against the rolls 56, 57 and also prevent any bending of the bearers 51, 53.

It will be noted in FIGS. 4 and 5 that a working roll in the operating position will be braced to prevent lateral distortion against the next succeeding or next preceding working roll in the cage. But the bracing means is of such character as to fit into the space between the backing rolls and the workpiece. Thus bracing means may be mounted between adjacent working rolls throughout the entire periphery of each cage. This would render it unnecessary to change working rolls when the direction of rolling is changed. Provision can be made for energizing the cylinders 55, 55' etc. with electric or fluid power irrespective of the indexed positions of the cages.

FIG. 4a shows an alternative solution for the prevention of lateral roll deflection. This solution, however, should be limited to rolling mills in which the working rolls are mounted closely together. Idler roll 61 is mounted between working rolls 62 and 63, forming a very effective backing element. Since both the idler roll 61 and the working roll 63 are out of contact with the backing roll 6, their speeds adjust to that of working roll 62. Idler roll 61 may be mounted in a manner similar to that of the working rolls.

Figure 6:
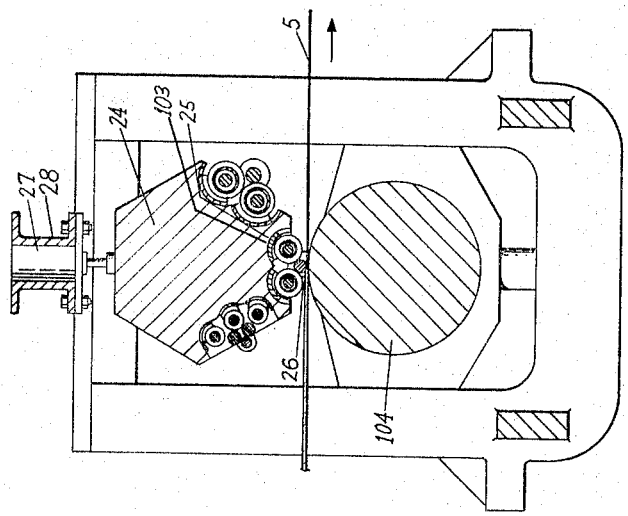
FIG. 6 is a transverse elevational view of a type of mill in which working rolls are backed on intermediate bearing members on a beam-like element.

FIG. 6 shows an arrangement of the mill wherein instead of a backing roll like 4 on FIG. 1 the same is replaced by a transverse beam 24 which acts as a support for sets of comparatively large diameter backing assemblies 25 interspaced with saddles 103 and supporting smaller diameter working rolls 26 in a so-called 1–2 configuration. The apparatus shown in FIGS. 6 and 7 may be driven by rotating the lower roll 104. In this case, working roll 26 may be driven by friction with the workpiece 5. However, the working roll 26 may be driven separately.

This apparatus may be adapted for use with any cluster configuration of rolls, as known in the art of Sendzimir Cold Mills. In the upper left portion of FIG. 6, a so-called 1–2–3 configuration is shown. 1–2–3–4 configuration may also be used with intermediate rolls driven.

If desired, the lower roll 104 may be replaced by a beam similar to 24 with roll arrangements mounted in it. In such cases, the rolls may be driven from opposite sides of the mill, as shown, for example, in FIG. 8 of U.S. Patent No. 2,194,212 to Tadeusz Sendzimir.

In order to hold this beam 24 in indexed position, mechanical or fluid locking means, not shown, are provided. Said means are actuated when the assembly is in position. Rotation of the beam 24 may be done also by means of ring gears not shown, similar to 8 on FIG. 2.

Figure 7:
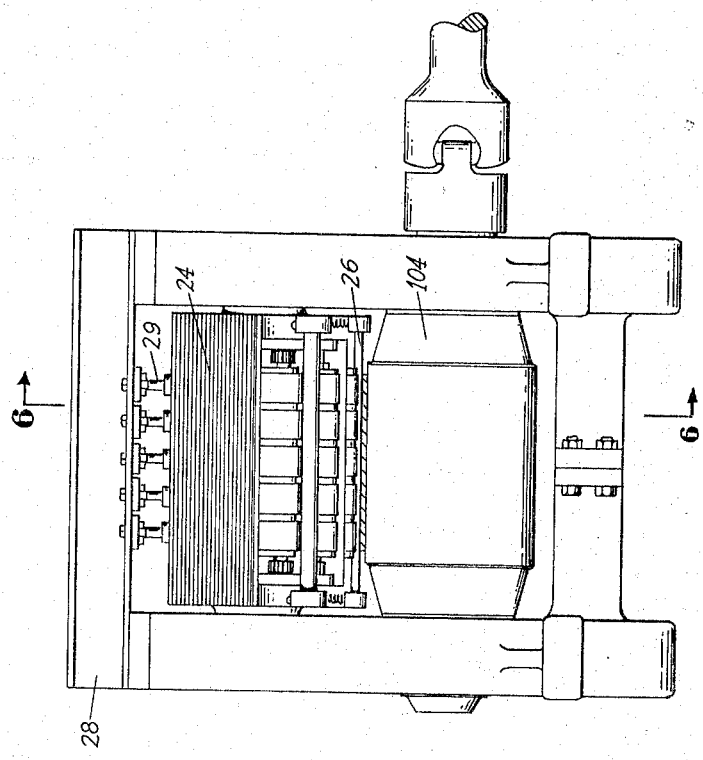
FIG. 7 is a front elevation of the same mill.

In the embodiment of FIGS. 6 and 7, the screw-down may be effected by a plurality of hydraulic cylinders 27 mounted in a beam 28 and acting on beam 24 through piston rods 29. By varying the pressure of respective cylinders 27, beam 24 may be flexed so as to vary the crown of the workpiece 5 as required.

Figure 9:
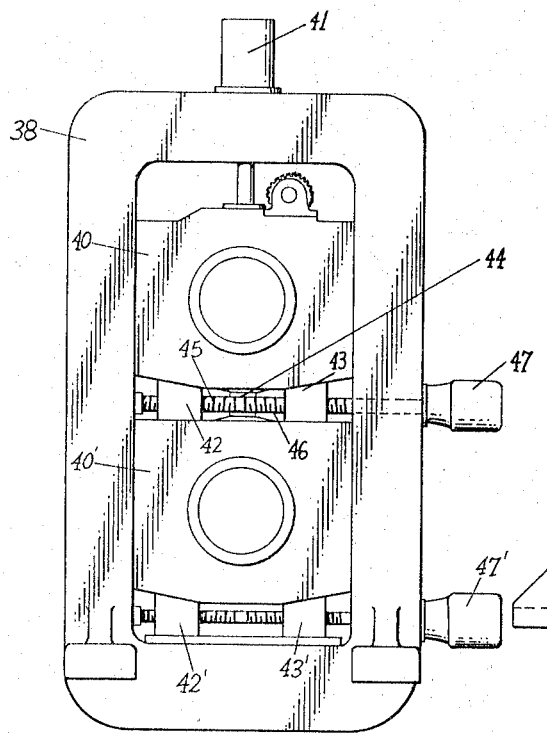
FIG. 9 is an end elevation of a mill showing a screwdown means.

The roll gap control of this mill is not limited to hydraulic, electrical or mechanical screw-down means but can also be done through pre-stressing as is shown in FIG. 9. Here, the housing frame 38 is pre-stressed by hydraulic cylinders 41, with a force always greater than that needed for the reduction of the workpiece. This excludes the so-called "stretch" of the frame, thus permitting a much lighter structure, particularly suitable to accommodate the present invention. The roll gap is then controlled by means of wedges 42, 43 located between chocks 40, 40'. The wedges are actuated by means of a shaft 44 provided with left and right handed threads 45, 46. An electric or fluid motor 47 is provided for driving the shaft 44. Thus, the distance between chocks 40, 40' may be adjusted by making the wedges 42, 43 approach or move away from each other. The application of wedges for height adjustment, as shown under the lower chock 40' is known in the art. Applicant, however, does not know any previous usage of wedges for roll gap control in a pre-stressed rolling mill.

Figure 10:
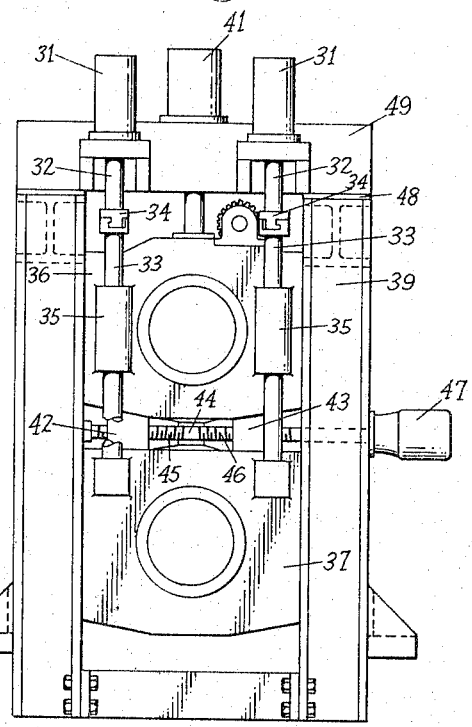
FIG. 10 is an elevational view of a mill having a welded or riveted frame and means for relieving stresses on the frame.

FIG. 10 shows yet another solution applicable to rolling mills of this type. Contrary to the common practice of using a cast housing frame, a welded or bolted frame may be used. As will be seen from the following, this frame will be practically free of any stresses and may be very light by comparison to frames known to the art.

Four hydraulic cylinders 31 are provided, mounted two on each side of the mill. The cylinder rods 32 are connected to tie-rods 33 through bayonet-type disconnect couplings 34. This type of construction is helpful in roll changing. The tie-rods 33 pass slidably through guides 35 which may be integral with the upper chock 36 and are affixed, as shown, to the lower chock 37. By exerting an upward pull on chocks 37 by means of cylinders 31 through the tie-rods 33, and countering it with an equal downward push on the upper chocks 36 by means of cylinders 41, the tie-rods 33 may be pre-stressed similarly to the frame 38 in FIG. 9. The roll gap is controlled in a manner similar to that shown in FIG. 9, by means of the wedges 42, 43. The pass line can be adjusted either by operation of the cylinders 31 and 41, or by the insertion of shims 48 between the frame 39 and the housing top 49.

The working roll chocks may be provided with quick release means for holding them in the cages.

Modifications may be made in the invention without departing from the spirit of it.

The embodiments of the invention in which an exclusive property or privilege is claimed are defined as follows:

1. A rolling mill structure with reducing means acting on both sides of the workpiece, at least one of said reducing means having rigid backing means and at least three comparatively slender working rolls distributed axially around the periphery of said backing means, said working rolls being rotatably mounted at their necks in such manner that each of said working rolls may be selectively brought into contact with the workpiece and held in a position to cooperate with the said other reducing means in reducing said workpiece.

2. A rolling mill structure with reducing means acting on both sides of the workpiece, at least one of said reducing means having rigid backing means and at least three comparatively slender working rolls distributed axially around the periphery of said backing means, said working rolls being rotatably mounted at their necks in such manner that each of said working rolls may be selectively brought into contact with the workpiece and held in a position to cooperate with the said other reducing means in reducing said workpiece, wherein said backing means is a relatively large driven backing roll, and wherein said working rolls have necks journalled in cages surrounding end portions of said backing roll, there being means whereby said cages may be indexed and held in positions to bring various ones of said working rolls into working position.

3. In a 4-hi mill, a mil frame, chocks mounted slidably in said mill frame, backing rolls having necks journalled in said chocks so that the axes of said rolls lie in a single plane, cages surrounding end portions of each of said backing rolls, a plurality of working rolls surrounding each of said backing rolls, said working rolls having end portions journalled in chocks in said cages, means mounting said cages rotatably with respect to said backing rolls, and means for indexing said cages so as to bring a working roll of one backing roll and a working roll of the other backing roll into operating position between said backing rolls with the axes of the last mentioned working rolls parallel to each other and substantially in the plane of the axes of the backing rolls, whereby to form a 4-hi mill combination in which various pairs of working rolls can be brought selectively into operating position.

4. The mill claimed in claim 3 wherein the means for indexing the said cages can be rendered independent of each other to permit cage adjustment.

5. The mill claimed in claim 3 including means for moving the chocks in which the working rolls are mounted in a direction radially away from the said backing rolls excepting when said working rolls are in working position.

6. The mill claimed in claim 3 wherein all of the working rolls are of the same size and diameter and wherein working rolls not in working position can be readily removed from said cages.

7. The mill claimed in claim 3 wherein the said working rolls for each backing roll differ from each other in one at least of the factors of size, surface finish and crown.

8. A mill as claimed in claim 3 wherein a pair of the working rolls when in operating position are braced against lateral deflection by means engaging another working roll in the same cage, said means comprising at least one element for engaging the faces of said working rolls.

9. The mill claimed in claim 3 including means for driving the said backing rolls.

10. The mill claimed in claim 3 including means supported by the said frame for dressing the surfaces of a working roll when the said roll is out of operating position.

11. The mill claimed in claim 3 including means on said frame for urging said first mentioned chocks toward each other with a force greater than the roll separating force of the mill when in use, and means for effecting separation of said chocks, said last mentioned means comprising wedges inserted between adjacent chocks and power means for moving said wedges.

12. The mill claimed in claim 3 in which the said frame is of light construction, and including power means for urging adjacent chocks toward each other with a force greater than the roll separating force of the mill in use, and means for separating the said adjacent chocks comprising wedges located therebetween and power means to move the said wedges.

13. The mill claimed in claim 5 wherein the means for moving the said chocks radially with respect to said cage is a resilient means which is overcome by the roll separating forces during rolling.

14. In a mill structure a backing element of generally polygonal cross section with longitudinally extending faces at least on one side of a workpiece, certain of the said faces being hollowed out to accept saddles and rotary backing means, small diameter working rolls supported by the last mentioned backing means, said backing means having a larger diameter, said polygonal structure being adjustable to several positions to bring said working rolls selectively into contact with said workpiece.

15. The mill claimed in claim 14 wherein said polygonal structure has plain faces located opposite the said hollowed faces, said mill having a frame with a cross member located opposite the said face, and means for exerting pressure between the said cross member and the said plain face whereby to diminish deflection of the said polygonal backing member.

16. The structure claimed in claim 15 in which a single large roll is located on the opposite side of said workpiece.

References Cited by the Examiner
UNITED STATES PATENTS
494,904  4/1893  Story _____ 72—226

WILLIAM W. DYER, JR., *Primary Examiner.*
G. A. DOST, *Assistant Examiner.*